US011863923B2

(12) United States Patent
Olson et al.

(10) Patent No.: US 11,863,923 B2
(45) Date of Patent: *Jan. 2, 2024

(54) SEALED ACOUSTIC SPEAKER AND MEDICAL DEVICE INCLUDING SAME

(71) Applicant: Medtronic, Inc., Mounds View, MN (US)

(72) Inventors: Nathan L. Olson, Shoreview, MN (US); Joseph Ippolito, Shoreview, MN (US); Matthew Saterbak, Robbinsdale, MN (US); Luke T. Babler, Minneapolis, MN (US); Thai Nguyen, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/483,996

(22) Filed: Sep. 24, 2021

(65) Prior Publication Data

US 2022/0014829 A1 Jan. 13, 2022

Related U.S. Application Data

(63) Continuation of application No. 16/721,003, filed on Dec. 19, 2019, now Pat. No. 11,159,864.

(60) Provisional application No. 62/782,451, filed on Dec. 20, 2018.

(51) Int. Cl.
*H04R 1/02* (2006.01)
*H04R 13/00* (2006.01)

(52) U.S. Cl.
CPC ............. *H04R 1/025* (2013.01); *H04R 1/028* (2013.01); *H04R 13/00* (2013.01); *H04R 2201/029* (2013.01)

(58) Field of Classification Search
CPC ........ H04R 1/025; H04R 1/028; H04R 13/00; H04R 2201/029; H04R 9/02; H04R 9/06; H04R 31/006
See application file for complete search history.

(56) References Cited

U.S. PATENT DOCUMENTS

| | | | |
|---|---|---|---|
| 6,343,128 B1 | 1/2002 | Coffin | |
| 6,876,752 B1 | 4/2005 | Guenther | |
| 8,045,747 B2 | 10/2011 | Gu | |
| 10,057,701 B2 | 8/2018 | Jankovsky et al. | |
| 11,159,864 B2 | 10/2021 | Olson | |
| 2008/0285787 A1 | 11/2008 | Szu-Wei | |
| 2009/0161905 A1 | 6/2009 | Konuma et al. | |
| 2010/0322461 A1* | 12/2010 | Gu | H04R 9/06 381/163 |

(Continued)

OTHER PUBLICATIONS

Prosecution History from U.S. Appl. No. 16/721,003, dated from Jan. 19, 2021 through Jun. 24, 2021, 37 pp.

*Primary Examiner* — Akelaw Teshale
(74) *Attorney, Agent, or Firm* — Shumaker & Sieffert, P.A.

(57) ABSTRACT

Various embodiments of a speaker and a method of forming such speaker are disclosed. The speaker includes a frame having a first major surface, a second major surface, and an opening disposed between the first and second major surfaces; a cone disposed adjacent the first major surface of the frame; and an adhesive layer disposed on at least a portion of the second major surface of the frame. The adhesive layer occludes the opening of the frame.

20 Claims, 5 Drawing Sheets

(56) References Cited

U.S. PATENT DOCUMENTS

| | | | |
|---|---|---|---|
| 2012/0095399 A1 | 4/2012 | Bazargan et al. | |
| 2016/0295337 A1* | 10/2016 | Jankovsky | H04R 1/288 |

* cited by examiner

SEALED ACOUSTIC SPEAKER AND MEDICAL DEVICE INCLUDING SAME

RELATED APPLICATIONS

This application is a continuation of U.S. patent application Ser. No. 16/721,003, filed Dec. 19, 2019, which claims the benefit of U.S. Provisional Application No. 62/782,451, filed Dec. 20, 2018, the disclosures of which are incorporated by reference herein in their entireties.

TECHNICAL FIELD

This disclosure generally relates to a sealed acoustic speaker.

BACKGROUND

Many electronic devices, including medical devices, utilize one or more speakers to generate sounds. Such sounds can include warnings that a critical event for a patient utilizing a medical device or the device itself is about to occur or is occurring. For example, an electronic device can be adapted to utilize a speaker to transmit an audible warning sound that indicates that the device has become disconnected from power or that one or more batteries associated with the device may be low on charge. Further, for example, a medical device such as a drug delivery device can be adapted to generate an audible warning sound utilizing a speaker that indicates to a patient that a supply of drug to be delivered to the patient may be running low.

In general, the form factor of many electronic devices such as medical devices have been steadily decreasing as the circuitry for such devices has become more compact. This decrease in form factor reduces the amount of space within a device that is available for components such as speakers.

SUMMARY

The techniques of this disclosure generally relate to a sealed acoustic speaker. The speaker can include a frame that includes an adhesive layer disposed on at least a portion of the frame such that the adhesive layer occludes one or more openings disposed in the frame. In one or more embodiments, the adhesive layer can include a flash-cured adhesive. The adhesive layer along with the frame and a cone disposed adjacent the frame can form a sealed cavity that can increase a sound pressure level output of the speaker.

In one example, aspects of this disclosure relate to a speaker. The speaker includes a frame having a first major surface, a second major surface, and an opening disposed between the first and second major surfaces; a cone disposed adjacent the first major surface of the frame; and an adhesive layer disposed on at least a portion of the second major surface of the frame. The adhesive layer occludes the opening of the frame.

In another example, aspects of this disclosure relate to a method that includes disposing a cone adjacent a first major surface of a frame and disposing an adhesive layer on at least a portion of a second major surface of the frame. The adhesive layer occludes an opening of the frame that is disposed between the first and second major surfaces of the frame.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also, the recitations of numerical ranges by endpoints include all numbers subsumed within that range as well as the endpoints (e.g., 1 to 5 includes 1, 1.5, 2, 2.75, 3, 3.80, 4, 5, etc.).

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
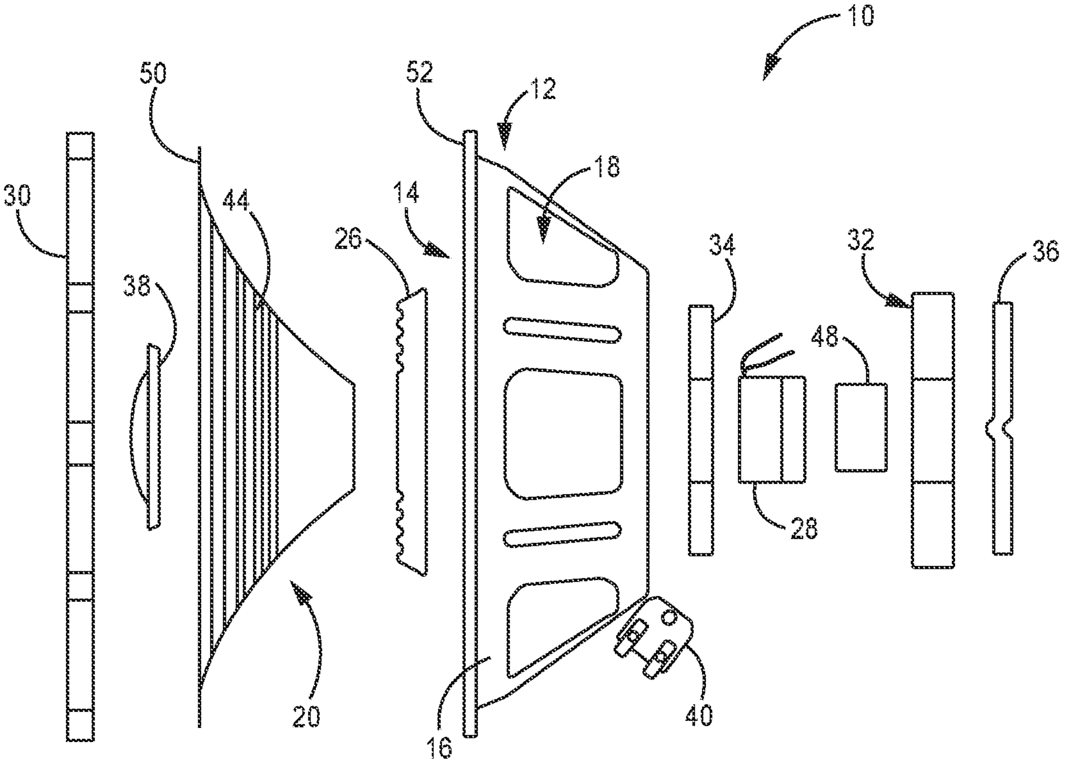
FIG. 1 is a schematic, exploded, cross-section view one embodiment of a speaker.
Figure 2:
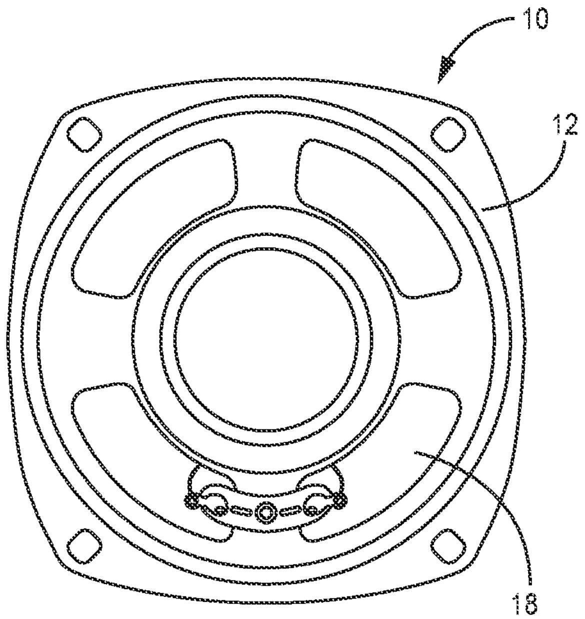
FIG. 2 is a schematic plan view of the speaker of FIG. 1 with an adhesive layer and optional scrim layer removed for clarity.

The techniques of this disclosure generally relate to a sealed acoustic speaker. The speaker can include a frame that includes an adhesive layer disposed on at least a portion of the frame such that the adhesive layer occludes one or more openings disposed in the frame. In one or more embodiments, the adhesive layer can include a flash-cured adhesive. The adhesive layer along with the frame and a cone disposed adjacent the frame can form a sealed cavity that can increase a sound pressure level output of the speaker.

Typical speakers include a frame and a cone or diaphragm that is disposed adjacent the frame. The cone can be connected to the frame at a perimeter of the cone such that the frame provides support for the cone. The frame can include one or more openings disposed therein to allow air that is displaced by a rear surface of the cone to pass through the frame.

One or more embodiments of speakers described herein can include an adhesive layer disposed on a frame such that the adhesive layer occludes or seals one or more openings disposed between a first major surface and a second major surface of the frame. While not wishing to be bound by any particular theory, in one or more embodiments, the adhesive layer can include a flash-cured adhesive that, during the flash-curing process, outgasses a gas into a space between the frame and a rear surface of a cone that is connected to the frame. Such gas can become sealed between the frame and the cone, thereby creating a positive pressure internal to the speaker. This increase in pressure within the speaker can in turn increase a potential volume or sound pressure level output of the speaker. Increasing the sound pressure level output of the speaker can enable use of a smaller speaker that requires less power and has a smaller footprint.

FIGS. 1-5 are various views of one embodiment of a speaker 10. The speaker 10 includes a frame 12 having a first major surface 14, a second major surface 16, and one or more openings 18 disposed between the first and second major surfaces of the frame. The speaker 10 also includes a cone 20 disposed adjacent the first major surface 14 of the frame 12, and an adhesive layer 22 (FIGS. 3-4) disposed on at least a portion 24 of the second major surface 16 of the frame. In one or more embodiments, the adhesive layer 22 occludes one or more of the openings 18 of the frame 12.

The speaker 10 can include any suitable type of speaker, e.g., a loudspeaker. Further, the speaker 10 can include any suitable components or elements. In the embodiment illustrated in FIGS. 1-5, the speaker 10 includes the frame 12, the cone 20, and the adhesive layer 22. In one or more embodiments, the speaker 10 can also include a suspension system, e.g., a spider 26 that connects the cone 20 to the frame 12 and constrains a voice coil 28. The speaker 10 can also include a gasket or surround 30 that connects the cone 20 to the frame 12, and a magnet 32 that interacts with the voice coil 28, thereby creating a mechanical force that causes the voice coil and the cone 20, which is connected to the voice coil, to move back and forth to reproduce sound based upon an electrical signal from an amplifier or other audio source that is directed to the speaker through terminals 40. The spider 26 allows the voice coil 28 to move freely along an axis of a core or pole 48 of the magnet 32. The voice coil 28 and magnet 32 can be held in place between a top plate 34 and a bottom plate 36. Further, a dust cap 38 can be disposed over an opening or void (not shown) in the cone 20 to protect the voice coil 28 from dust and dirt.

The frame 12 includes the first major surface 14, the second major surface 16, and one or more openings 18 disposed between the first and second major surfaces. The frame 12 can take any suitable shape and have any suitable dimensions. In general, the frame 12, which is rigid to provide support to the cone 20, can include any suitable material or materials, e.g., one or more metallic, polymeric, or inorganic materials.

Figure 3:
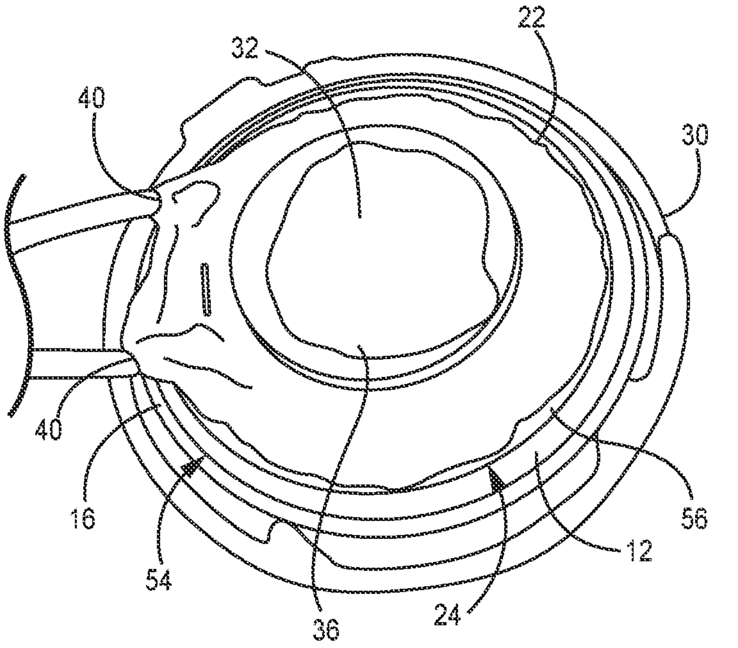
FIG. 3 is a schematic rear perspective view of the speaker of FIG. 1.
Figure 4:
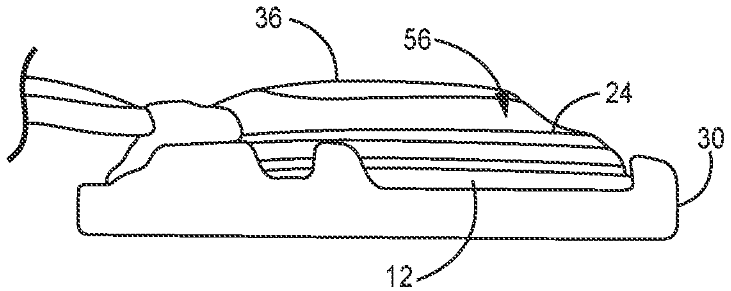
FIG. 4 is a schematic side view of the speaker of FIG. 1.

The frame 12 can include any suitable number of openings 18, e.g., one, two, three, four, five, or more openings. In one or more embodiments, the frame 12 can include a plurality of openings 18. As can be seen in FIG. 3, which is a plan view of the speaker 10 with the adhesive layer 24 and a scrim layer 56 removed for clarity, the speaker includes four openings 18. Further, each opening 18 can take any suitable shape or shapes and have any suitable dimensions. The openings 18 can be disposed in any suitable location through the frame 12.

Disposed adjacent the first major surface of the frame 12 is the cone 20. As used herein, the phrase "adjacent the first major surface of the frame" means that the cone 20 is disposed closer to the first major surface 14 of the frame 12 than to the second major surface 16 of the frame. In one or more embodiments, the cone 20 can be in contact with the frame 12. For example, in one or more embodiments, a perimeter 50 of the cone 20 can be sealed to a perimeter 52 of the frame 12 using any suitable technique or techniques. For example, the gasket 30 can be connected to the perimeter 50 of the cone 20 and the perimeter 52 of the frame 12, where the gasket is adapted to seal the perimeter of the cone to the perimeter of the frame using any suitable technique or techniques.

Figure 5:
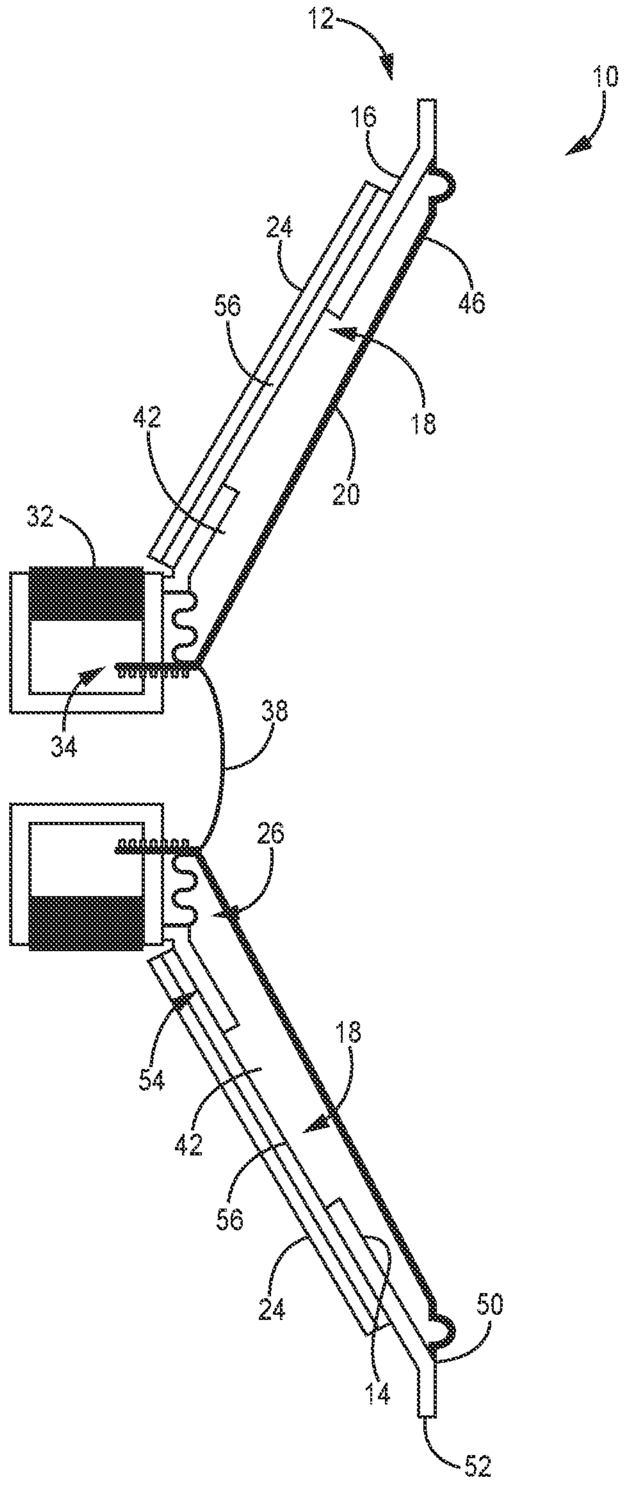
FIG. 5 is a schematic cross-section view of the speaker of FIG. 1.

The cone 20 can take any suitable shape and have any suitable dimensions. In one or more embodiments, the cone 20 can take a cone- or dome-shaped cross-sectional shape in a plane orthogonal to the perimeter 50 of the cone as shown in FIGS. 1 and 5. Further, the cone 20 can include any suitable material or materials, e.g., one or more metallic, polymeric, or inorganic materials. In one or more embodiments, the cone 20 can include a composite material, e.g., cellulose paper combined with one or more of carbon fiber, Kevlar, glass, hemp, or bamboo fibers. Further, in one or more embodiments, the cone 20 can include a coating that can be adapted to provide additional stiffening or dampening to the cone. Typically, the cone 20 can be adapted to be rigid to prevent uncontrolled cone motions, have low mass to minimize starting force requirements and energy storage issues, and be well damped to reduce vibrations continuing after the single has stopped with little or no audible ringing due to its resonance frequency as determined by its usage.

The adhesive layer 24 is disposed on at least a portion 54 of the second major surface 16 of the frame 12 as shown in FIG. 3. In one or more embodiments, the adhesive layer 24 occludes one or more openings 18 of the frame 12. In one or more embodiments, the adhesive layer 24 occludes each opening 18 of the frame 12. As used herein, the term "occludes" means that the adhesive layer 24 completely blocks or covers an opening 18 such that gas such as air cannot pass through the opening. The adhesive layer 24 can be a continuous layer or a patterned layer. For example, in one or more embodiments, the adhesive layer 24 can be patterned such that it is disposed over one or more of the openings 18 but not disposed on one or more portions of the second major surface 16 of the frame 12 or scrim layer 56.

The adhesive layer 24 can include any suitable adhesive, e.g., one or more thermoplastic, thermoset, epoxy, UV curable, or pressure-sensitive adhesives. In one or more embodiments, the adhesive layer 24 includes a flash-cured adhesive such as Loctite 4311 available from Henkel AG & Co. KGaA (Dusseldorf, Germany). The adhesive layer 24 can include an adhesive having any suitable viscosity. In one or more embodiments, the adhesive of the adhesive layer 24 can be viscous enough such that the adhesive layer does not flow through one or more of the openings 18 and contact the cone 20.

The adhesive of the adhesive layer 24 can be cured using any suitable technique or techniques, e.g., flash curing, heat curing, UV curing, etc. Further, the adhesive of the adhesive layer 24 can have any suitable cure time.

The adhesive layer 24 can be disposed directly onto one or more portions of the second major surface 16 of the frame 12. In one or more embodiments, speaker 10 can include a scrim layer 56 disposed on the second major surface 16 of the frame 12 and over one or more of the openings 18 as shown in FIG. 5. In one or more embodiments, the scrim layer 56 can be disposed over each of the openings 18. Further, in one or more embodiments, the scrim layer 56 can be connected to the second major surface 16 of the frame 12 using any suitable technique or techniques. For example, the scrim layer 56 can be attached to the second major surface 16 of the frame 12 using an adhesive, e.g., a pressure sensitive adhesive, such that the scrim layer is held in place on the second major surface of the frame.

The scrim layer 56 can include any suitable material or materials, e.g., one or more metallic, polymeric, or inorganic materials. In one or more embodiments, the scrim layer 56 includes an inorganic cloth material. In one or more embodiments, the material or materials and construction of the scrim layer 56 can be selected to provide a scrim layer that is breathable such that gas can pass through the scrim layer.

As mentioned herein, the adhesive layer 24 can be disposed on at least a portion 54 of the second major surface 14 of the frame 12. In embodiments where the speaker 10 includes a scrim layer 56, at least a portion of the adhesive layer 24 can be disposed on the scrim layer 56 such that the scrim layer is disposed between the adhesive layer and one or both of the frame 12 and one or more openings 18. For example, as illustrated in FIG. 5, the scrim layer 56 is disposed between the adhesive layer 24 and the frame 12. Further, the scrim layer 56 is disposed between the adhesive layer 24 and one or more openings 18 of the frame 12. In such embodiments, the adhesive layer 24 can occlude one or more of the openings 18 by sealing the openings in the scrim layer 56 and the opening in the frame such that a gas cannot pass through the scrim layer and the opening.

In one or more embodiments, the adhesive layer 24 defines a sealed cavity 42 (FIG. 5) between the cone 20 and the first major surface 14 of the frame 12. In one or more embodiments, the frame 12, cone 20, adhesive layer 24, scrim layer 56, and optionally the spider 36 and dust cap 38 can define the sealed cavity 42.

As mentioned herein, the speaker 10 also includes the magnet 32 disposed adjacent the second major surface 16 of the frame 12. As used herein, the phrase "adjacent the second major surface" means that the magnet 32 is disposed closer to the second major surface 16 of the frame 12 than to the first major surface 14 of the frame.

The magnet 32 can include any suitable magnetic material or materials, e.g., ceramic, ferrite, rare earth materials such as neodymium and samarium cobalt, etc. In one or more embodiments, the magnet 32 can include a ferrite magnet having a mix of ceramic clay and fine particles of barium or strontium ferrite. Further, the magnet 32 can take any suitable shape or shapes and have any suitable dimensions.

Figure 6:
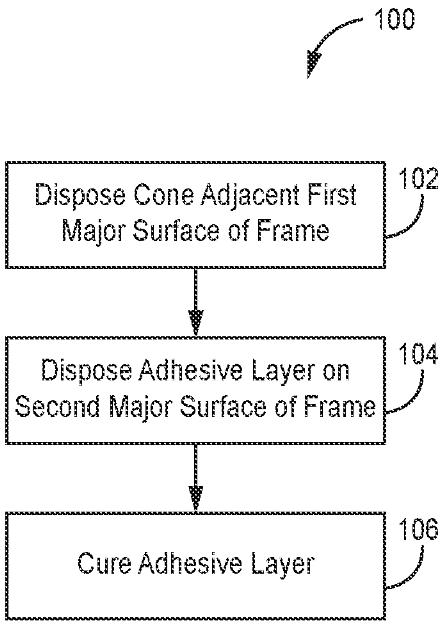
FIG. 6 is a flowchart of a method of forming the speaker of FIG. 1.

The speaker 10 can be manufactured using any suitable technique or techniques. For example, FIG. 6 is a flowchart of one embodiment of a method 100 of forming the speaker 10. Although described in reference to speaker 10 of FIGS. 1-5, the method 100 of FIG. 6 can be utilized to form any suitable speaker.

At 102, the cone 20 is disposed adjacent the first major surface 14 of the frame 12. In one or more embodiments, the perimeter 50 of the cone 20 is sealed to the perimeter 52 of the frame 12 using any suitable technique or techniques. In one or more embodiments, the gasket 30 can be connected to the perimeter 52 of the frame 12 and the perimeter 50 of the cone 20 such that the gasket seals the perimeter of the cone to the perimeter of the frame. In one or more embodiments, the scrim layer 56 can be disposed on the second major surface 16 of the frame 12 and over one or more of the openings 18 using any suitable technique or techniques. For example, an adhesive can be disposed on one or both of the second major surface 16 of the frame 12 and the scrim layer 56 to attach the scrim layer to the second major surface of the frame.

The adhesive layer 24 can be disposed on at least a portion 54 of the second major surface 16 of the frame 12 using any suitable technique or techniques at 104, e.g., hand dispensing, pre-cut shape dispensing, etc. In embodiments where the speaker 10 includes the scrim layer 56, the adhesive layer 24 can be disposed on one or both of the scrim layer and the second major surface 16 of the frame 12 using any suitable technique or techniques. In one or more embodiments, disposing the adhesive layer 24 defines the sealed cavity 42 between the cone 20 and the first major surface 14 of the frame 12.

At 106, adhesive layer 24 can be cured using any suitable technique or techniques. For example, in one or more embodiments, the adhesive layer 24 can be UV cured.

In one or more embodiments, the magnet 32 can be disposed adjacent the second major surface 16 of the frame 12 using any suitable technique or techniques. The magnet 32 can be connected to the cone 20 through a port (not shown) disposed in the frame 12 using any suitable technique or techniques. The magnet 32 can be disposed adjacent the second major surface 16 of the frame 12 either prior to or after the adhesive layer 24 is disposed on at least a portion of the second major surface 16 of the frame 12.

While not wishing to be bound by any particular theory, curing the adhesive layer 24 can cause the adhesive layer to expel one or more gases that are at least in part directed through the scrim layer 56 (if present) and one or more of the openings 18 and into the sealed cavity 42 between the cone 20 and the frame 12. This outgassing caused by curing the adhesive layer 24 can create or increase positive pressure within the seal cavity 42. This increase in positive pressure of the seal cavity 42 can cause an increase in the sound pressure level (i.e., volume output) of the speaker 10. In one or more embodiments, the speaker 10 can have an increase in sound pressure level of at least 1 dB for sound frequencies in a range of at least 20 Hz and no greater than 22 kHz as compared to a speaker that does not include an adhesive layer that occludes one or more openings of the frame of the speaker.

Figure 7:
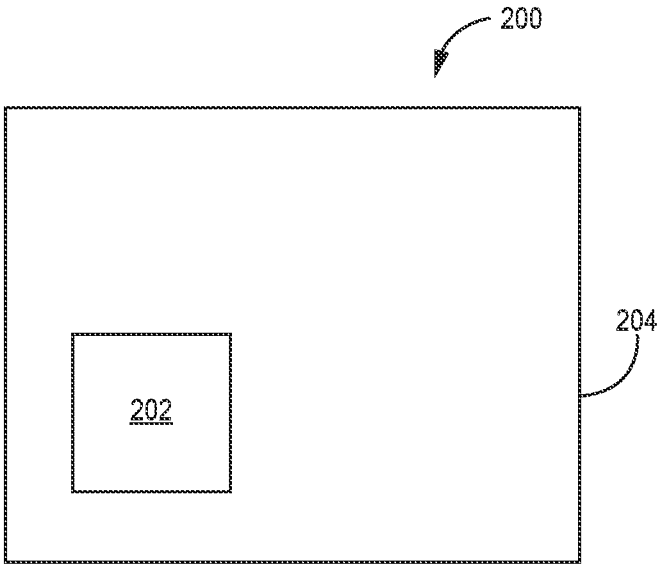
FIG. 7 is a schematic cross-section view of one embodiment of a medical device that includes a speaker.

The various embodiments of speakers described herein can be utilized with any suitable device or system, e.g., medical devices, audio devices such as headphones or loudspeakers, traffic warning systems, telephones, smartphones, wearable devices, etc. For example, FIG. 7 is a schematic cross-section view of one embodiment of a medical device 200. The medical device 200 includes a speaker 202 disposed within or connected to a housing 204 of the medical device 200. The medical device 200 can include any suitable medical device, e.g., a ventricular assist device controller, medical devices having audible alarm systems, etc. Further, the speaker 202 can include any suitable speaker described herein, e.g., speaker 10 of FIGS. 1-5.

In general, because of the increase in sound pressure level provided by one or more embodiments of speakers described herein, speaker 202 can have a smaller footprint within medical device 200 while still meeting volume requirements for such medical device. The smaller footprint provided by one or more embodiments of speakers described herein can also use less energy than larger speakers that may have previously been required to provide the desired sound pressure level output.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include computer-readable storage media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

All references and publications cited herein are expressly incorporated herein by reference in their entirety into this disclosure, except to the extent they may directly contradict this disclosure. Illustrative embodiments of this disclosure are discussed, and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A speaker, comprising:

a frame comprising a first major surface and a second major surface, the frame having an opening disposed between the first major surface and the second major surface;

a cone disposed adjacent the first major surface of the frame, wherein the frame provides support to the cone; and an adhesive layer disposed on at least a portion of the second major surface of the frame, wherein the adhesive layer occludes the opening, wherein the first major surface, the cone, and the adhesive layer define a sealed cavity between the first major surface and the cone.

2. The speaker of claim 1, further comprising a magnet disposed adjacent the second major surface of the frame, wherein the magnet is connected to the cone through a port disposed in the frame.

3. The speaker of claim 1, further comprising a scrim layer disposed on the second major surface of the frame and over the opening, wherein at least a portion of the adhesive layer is disposed on the scrim layer.

4. The speaker of claim 1, wherein the adhesive layer comprises a UV curable adhesive.

5. The speaker of claim 1, wherein a perimeter of the cone is sealed to a perimeter of the frame.

6. The speaker of claim 5, further comprising a gasket connected to the perimeter of the frame and the perimeter of the cone, wherein the gasket is adapted to seal the perimeter of the cone to the perimeter of the frame.

7. The speaker of claim 1, wherein the adhesive layer comprises pressure-sensitive adhesive.

8. The speaker of claim 1, wherein the adhesive layer comprises a thermoplastic adhesive.

9. The speaker of claim 1, wherein the frame defines a plurality of openings, wherein the adhesive layer occludes each opening of the plurality of openings.

10. The speaker of claim 1, wherein the speaker further comprises an increase in sound pressure level of at least 1 dB for sound frequencies in a range of at least 20 Hz and no greater than 22 kHz as compared to a speaker that does not include the adhesive layer.

11. A medical device comprising the speaker of claim 1.

12. The speaker of claim 1, wherein the sealed cavity is configured to seal a gas between the frame and the cone to create a positive pressure within the cavity.

13. The speaker of claim 12, further comprising a scrim layer disposed on the second major surface of the frame and over the opening, wherein at least a portion of the adhesive layer is disposed on the scrim layer, wherein the adhesive layer comprises an adhesive configured to outgas the gas during a curing process, and wherein the scrim layer is a breathable layer configured to allow the gas to pass through the scrim layer and into the sealed cavity when the adhesive outgasses the gas.

14. The speaker of claim 1, further comprising a spider connecting the cone and the frame, wherein the first major surface, the cone, the adhesive, and the spider define the sealed cavity.

15. A method, comprising:

disposing a cone adjacent a first major surface of a frame, wherein the frame comprises a second major surface and has an opening disposed between the first major surface and the second major surface, and wherein the frame supports the cone; and disposing an adhesive layer on at least a portion of the second major surface of the frame, wherein the adhesive layer occludes the opening such that the first major surface, the cone, and the adhesive layer define a sealed cavity between the first major surface and the cone.

16. The method of claim 15, further comprising disposing a magnet adjacent the second major surface of the frame, wherein the magnet is connected to the cone through a port disposed in the frame.

17. The method of claim 15, further comprising curing the adhesive layer.

18. The method of claim 17, further comprising outgassing, during the curing process, a gas from the adhesive layer and into the sealed cavity.

19. The method of claim 15, further comprising disposing a scrim layer on the second major surface of the frame and over the opening prior disposing the adhesive layer, wherein disposing the adhesive layer comprises disposing the adhesive layer on the scrim layer.

20. The method of claim 15, further comprising sealing a perimeter of the cone to a perimeter of the frame to cause the frame to support the cone.

* * * * *